United States Patent
Rengakuji et al.

(10) Patent No.: US 6,671,418 B2
(45) Date of Patent: *Dec. 30, 2003

(54) IMAGE PROCESSING APPARATUS AND METHOD WHICH DETERMINES A BLOCK SIZE IN ACCORDANCE WITH A FILTER STRUCTURE

(75) Inventors: Hideyuki Rengakuji, Kawasaki (JP); Yuji Sakaegi, Yokohama (JP); Masato Kosugi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,717

(22) Filed: Mar. 9, 1999

(65) Prior Publication Data
US 2003/0048951 A1 Mar. 13, 2003

(30) Foreign Application Priority Data
Mar. 11, 1998 (JP) ............................................. 10-060111

(51) Int. Cl.$^7$ ................................................. G06K 9/40
(52) U.S. Cl. ...................................... 382/264; 382/232
(58) Field of Search .................................. 382/232, 171, 382/299, 260, 264; 348/222, 224, 231, 240, 222.1, 224.1, 231.99, 240.2

(56) References Cited

U.S. PATENT DOCUMENTS

| 5,168,375 A |   | 12/1992 | Reisch et al. ................ 358/432 |
| 5,402,171 A | * | 3/1995 | Tagami et al. .............. 348/219 |
| 5,481,737 A | * | 1/1996 | Ito et al. ...................... 711/211 |
| 5,666,163 A | * | 9/1997 | Lee et al. .................... 348/441 |
| 5,748,792 A | * | 5/1998 | Wober ........................ 382/250 |
| 5,867,214 A | * | 2/1999 | Anderson et al. ........... 348/231 |
| 5,901,242 A | * | 5/1999 | Crane et al. ................ 382/166 |

FOREIGN PATENT DOCUMENTS

| GB | 2247132 | 2/1992 | .......... H04N/7/133 |
| JP | 5227414 | 9/1993 | .......... H04N/1/393 |
| WO | 97/01830 | 1/1997 | ............ G06K/9/36 |
| WO | 97/14252 | 4/1997 | ............ H04N/7/18 |

* cited by examiner

*Primary Examiner*—Timothy M. Johnson
(74) *Attorney, Agent, or Firm*—Fitzpatrick, Cella, Harper & Scinto

(57) ABSTRACT

Input image data is divided into blocks so as to make adjacent blocks partially overlap image data, and the divided image data is filtered in the unit of block. An image processing apparatus and method are provided which can process image data of an arbitrary size at high speed independently from the capacity of a buffer memory, and a computer readable storage medium is provided which stores a program realizing such a method.

17 Claims, 15 Drawing Sheets

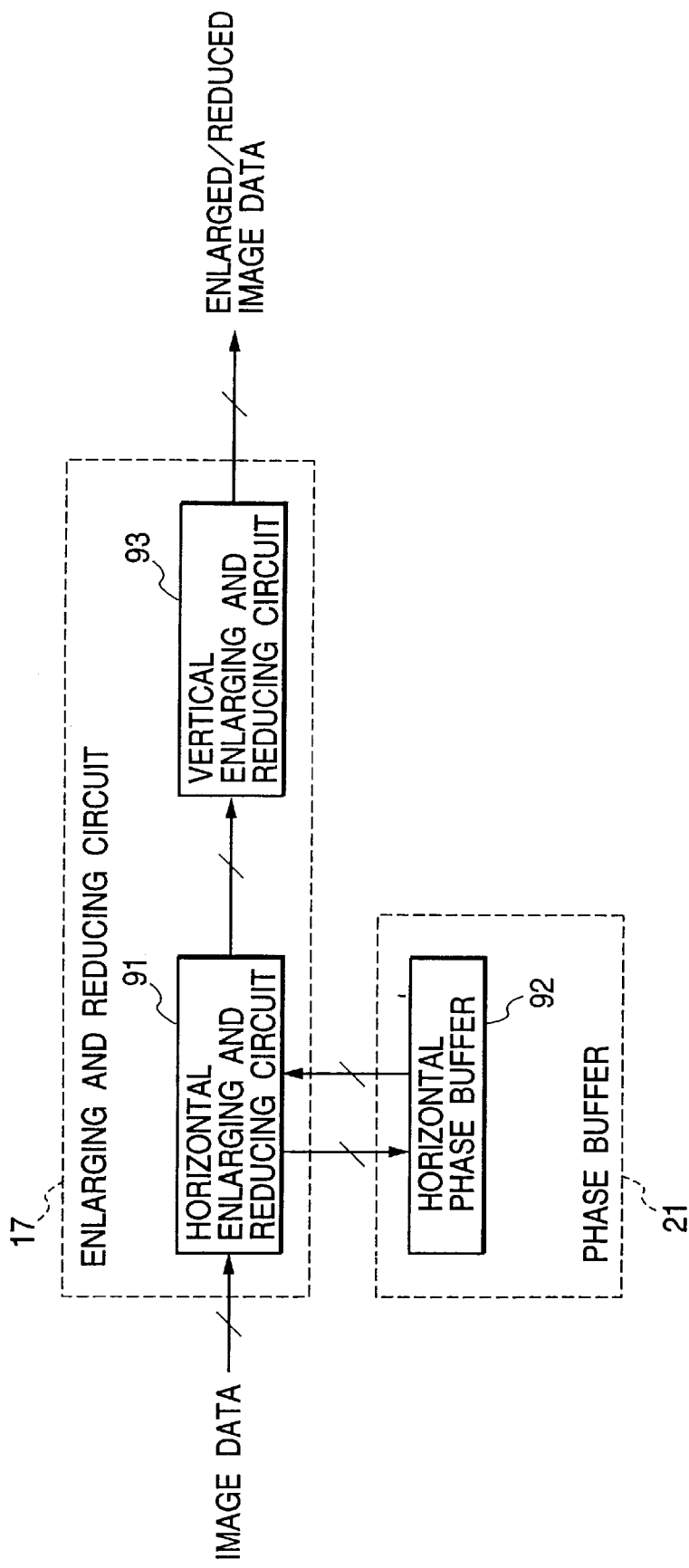

IMAGE PROCESSING APPARATUS AND METHOD WHICH DETERMINES A BLOCK SIZE IN ACCORDANCE WITH A FILTER STRUCTURE

BACKGROUND OF THE INVENTION

1. Field of the Invention

The present invention relates to an image processing apparatus and method suitable for performing a filtering process and coding process of image data, and to a computer readable storage medium storing process for realizing such a method.

2. Relata Background Art

Digital still cameras are widely used as an image pickup device for computers. An image compression method utilizing DCT (discrete cosine transform) such as JPEG is used for digital still cameras. While digital still cameras are prevailing, high speed continuous photographing and power saving have been desired. In order to shorten the time taken to pickup images and record image data, the processes from signal processing to image compression have been conducted heretofore by hardware.

With a conventional hardware configuration, a capacity proportional to the input image scan size in a horizontal direction is required for a buffer which is used for filtering accumulated charge information read from image pickup elements such as CCD in horizontal and vertical directions and for a buffer which is used for raster/block conversion of raster scan sequential image data into block scan sequential image data. For example, assuming that input image data has 1034 pixels in the horizontal direction and 770 pixels in the vertical direction, a horizontal filter has 11 taps, a vertical filter has 3 taps, a YUV sampling ratio of JPEG is 4:2:2, CCD image data has 10 bits, and each of YUV has 8 bits, the following data is determined:

Hd=1034, where Hd is the number of pixels of input image data in the horizontal direction;

Hr=1034−INT(11/2)×2=1024, where Hr is the number of pixels of image data in the horizontal direction output after signal processing (a filtering process, a YC separation, an edge process, a gamma process, and the like);

a capacity of a buffer for filtering in the horizontal and vertical directions =2×Hd×10=20680 (bits); and a capacity of a buffer for raster/block conversion=8×Hr ((the number of bits of Y) +(the number of bits of UV)) =8×1024×16=131072 (bits).

In the system using a plurality of image sizes, the buffer capacity has been determined conventionally in accordance with a maximum horizontal image size, respectively for a buffer for filtering in the horizontal and vertical directions and for a buffer for raster/block conversion. This is not economical.

Conventional techniques are associated with a problem that when a CCD sensor of non-square is used, the compressed image data has distortion.

There is also a problem that since image data after signal processing is JPEG compressed, it is difficult to resize the image data.

SUMMARY OF THE INVENTION

Under the above-described background of the invention, it is an object of the present invention to provide an image processing apparatus and method capable of processing image data having an arbitrary size at high speed independently from the capacity of a buffer memory, and a computer readable storage medium storing processes realizing such a method.

In order to achieve the above object of the invention, according to one aspect of the present invention, there is provided an image processing apparatus/method wherein input image data is divided into blocks adjacent blocks of which partially overlap the image data, and the divided image data is subject to a filtering process in a block unit basis.

According to an another aspect of the present invention, there is provided readable storage medium which stores a program executing steps of inputting image data and dividing the input image data into blocks adjacent blocks of which partially overlap the image data.

Other objects, features and advantages of the invention will become apparent from the following detailed description taken in conjunction with the accompanying drawings.

BRIEF DESCRIPTION OF THE DRAWINGS

FIG. 17 is a block diagram showing the structures of an enlarging and reducing circuit and phase buffers according to the fourth embodiment.

DETAILED DESCRIPTION OF THE PREFERRED EMBODIMENTS

Figure 1:
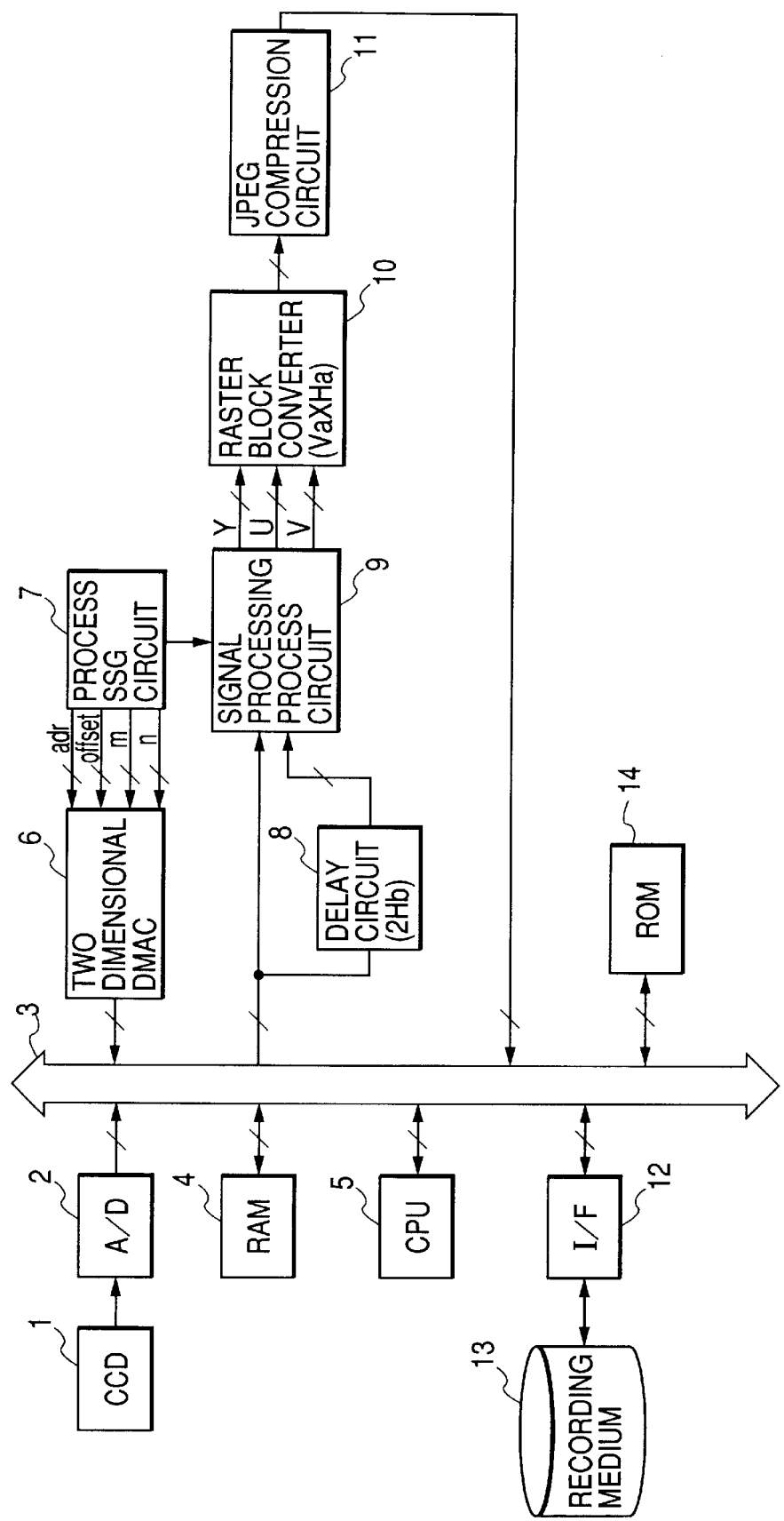
FIG. 1 is a block diagram showing the structure of an image processing apparatus according to a first embodiment of the invention.

FIG. 1 is a block diagram showing an image processing apparatus according to the first embodiment of the present invention. A ROM 14 is a storage medium for storing a program which is used by a CPU 5 to execute a process to be described later. This storage medium may be a semiconductor memory, an optical disk, a magneto-optic disk, a magnetic medium or the like. These storage media may also be a non-volatile memory card, a DC-ROM, a floppy disk, a magnetic card or the like.

Figure 2:
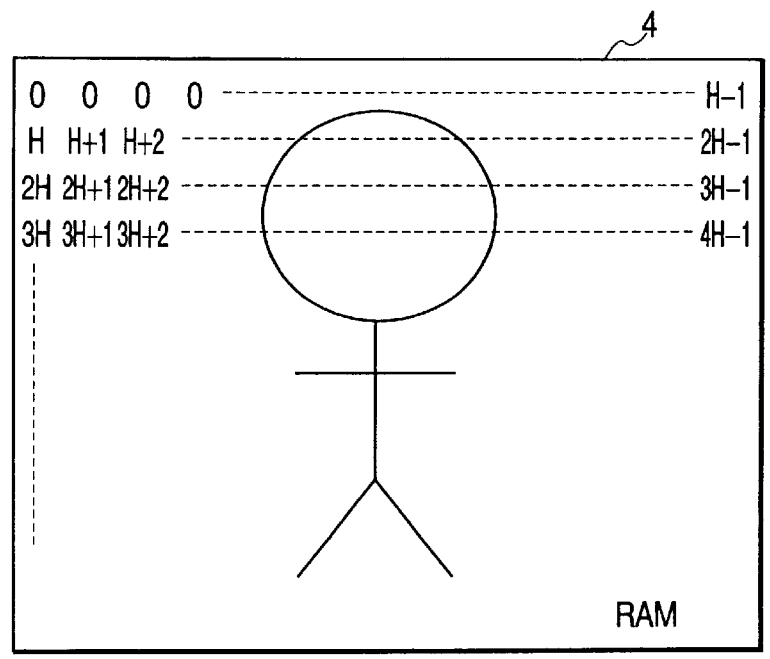
FIG. 2 is a diagram showing image data stored in RAM 4.

Referring to FIG. 1, an image focussed upon a CCD 1 by an optical system not shown is converted into accumulated charge information which is converted by an A/D converter 2 from analog signals into digital signals. The digital signal is transferred via a CPU bus 3 to a RAM 4. If frame read of CCD 1 is performed, the digital accumulated charge information is stored in RAM 4 as shown in FIG. 2.

CPU 5 sets predetermined parameters to a signal processing circuit 9, a process SSG circuit 7 and a JPEG compression circuit 11, and instructs the process SSG circuit 7 to process signals. The predetermined parameters include an image data location of a memory, an image size, color filter information of CCD 1, a gamma correction value, an image compression set value and the like.

The process SSG circuit 7 sets four values, including a DMA transfer start address (adr), a horizontal transfer number (m), a vertical transfer number (n), and a vertical offset value (offset) to a two-dimensional DMAC (direct memory access controller) 6 to thereby read image data from RAM 4.

Figure 3:
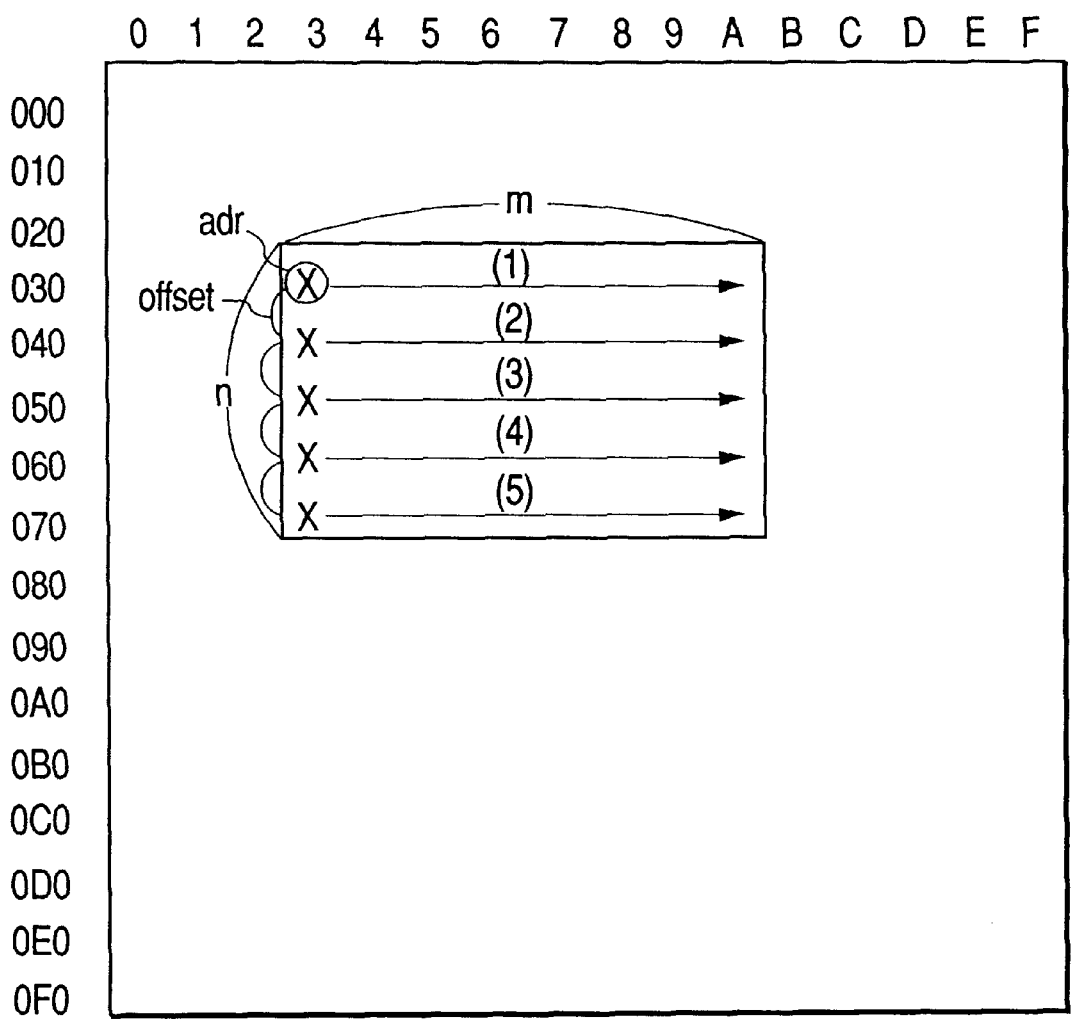
FIG. 3 is a diagram illustrating the operation of a two-dimensional DMAC.

FIG. 3 illustrates the read sequence of image data from RAM 4 assuming that adr=0x030 (hereinafter, numerals added with 0x are hexadecimal numerals), m=0x8, n=0x5, and offset=0x010.

The two-dimensional DMAC 6 holds adr therein as a read start address, and resets an internal counter for holding the horizontal read number and another internal counter for holding the vertical read number, to "0". Each time data is read, the counter for holding the horizontal read number is incremented by "1".

When the count of the counter for holding the horizontal read number coincides with m, the data read start address is incremented by offset, the counter for holding the horizontal read number is reset to "0", and the counter for holding the vertical read number is incremented by "1". Data read is terminated after the counter for holding the vertical read number coincides with n. In this manner, by sequentially changing the read address, data is read from a rectangular area of RAM 4 as shown in FIG. 3.

Figure 4:
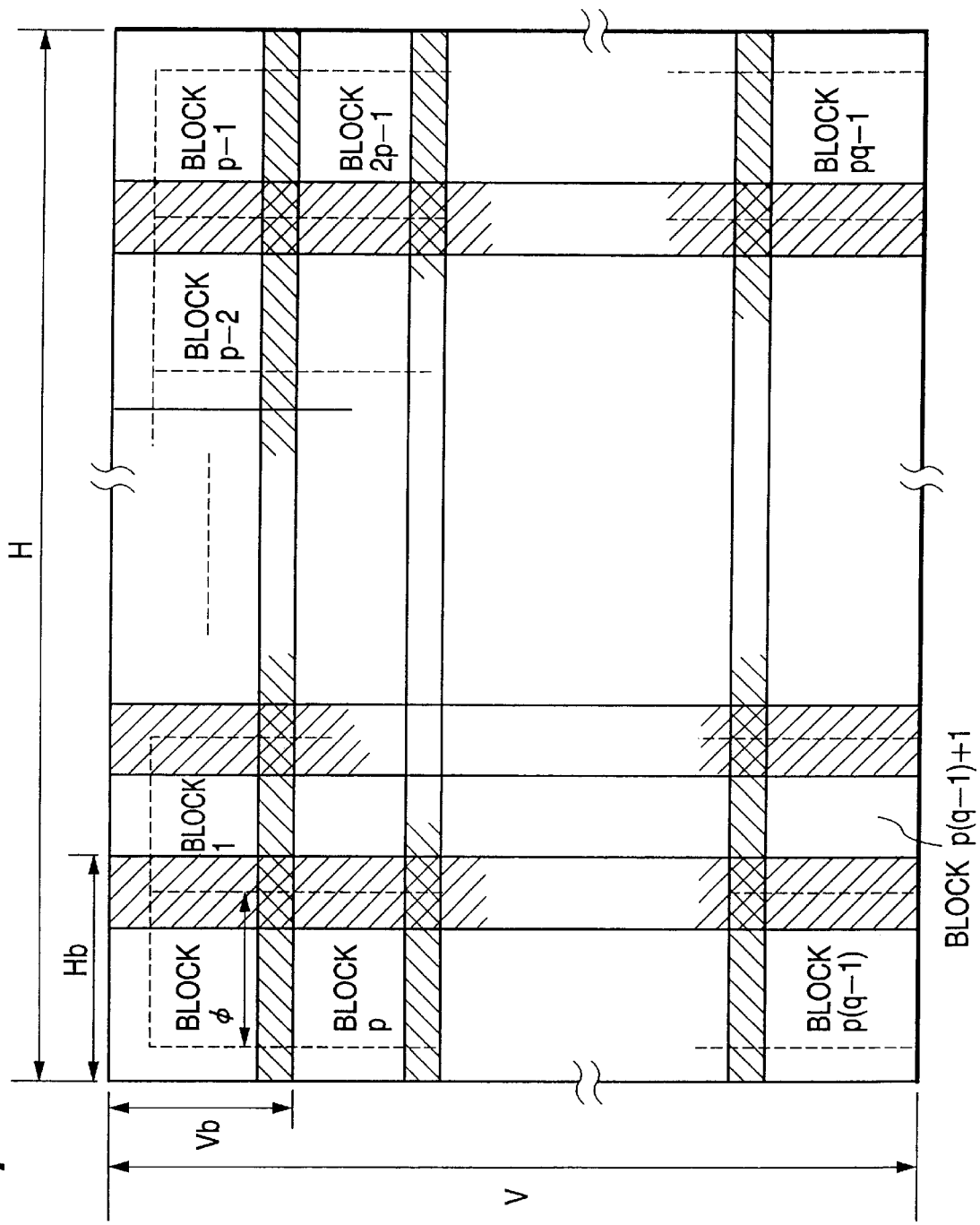
FIG. 4 is a diagram illustrating a method of dividing input data, the method being executed by a signal processing circuit.

The process SSG circuit 7 repetitively controls the two-dimensional DMAC 6 to divide image data in RAM 4 into a plurality of blocks and read blocks 0, 1, 2, . . . pg-1 in this order from RAM 4 as shown in FIG. 4.

Referring to FIG. 4, H and V represent the horizontal and vertical sizes of image data of one from transferred from CCD 1 to RAM 4. The image data is divided into p×q blocks, p blocks in the horizontal direction and 1 blocks in the vertical direction, with hatched portions being overlapped.

Image data read from RAM 4 in the above manner is sent via the cpu bus 3 to a delay circuit 8 and signal processing circuit 9. A storage capacity of the delay circuit 8 is:

2 (lines)×Hb×(the number of bits expressing one pixel).

Figure 5:
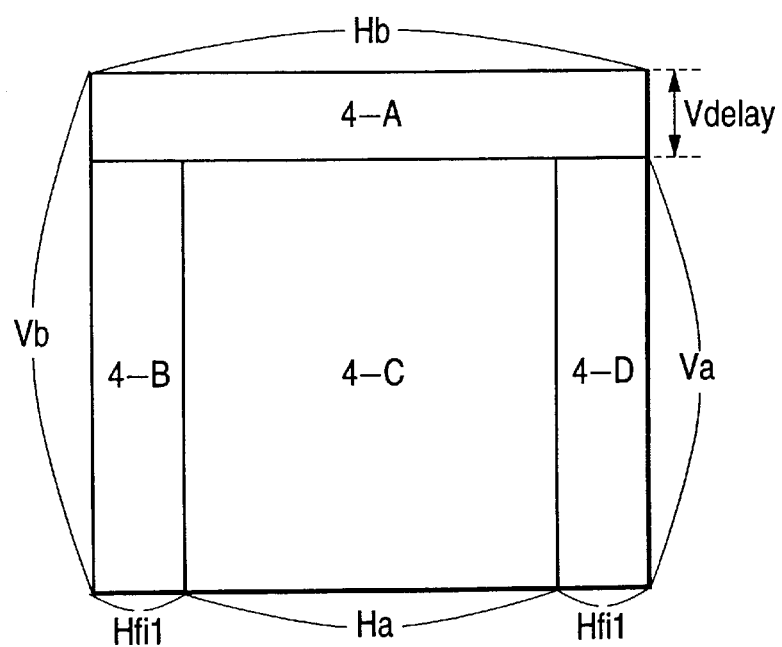
FIG. 5 is a diagram showing an effective image area of each divided area.

Each block shown in FIG. 4 is constituted of four areas as shown in FIG. 5.

Referring to FIG. 5, an area 4-A is an area wherein image data read from RAM 4 is valid and image data read from the delay circuit 8 is invalid. Therefore, in this area, an output from the signal processing circuit 9 is also invalid. "Vdelay" is equal to the number of delayed lines. In this embodiment, the Vdelay is "2" assuming that the signal processing circuit 9 uses a filter with three vertical taps.

Areas 4-B and 4-D are areas wherein although image data read from RAM 4 and delay circuit 8 is valid, an output of the signal processing circuit 9 is invalid because horizontal image data of two lines exist in the filters of the signal processing circuit 9. If it is assumed that the signal processing circuit 9 is formed by a circuit constituted of a delay circuit and a filter having the number of NTap of taps in the horizontal direction, the length of the areas 4-B and 4-D in the horizontal direction is NTap/2. For example, the horizontal length is "5" if NTap is "11" because of rounding off the numerals lower than the decimal point. In this embodiment, NTap is "11" so that the horizontal length Hfil="5".

An area 4-C is an area wherein an outoput of the signal processing circuit 9 is valid. The horizontal length Ha of this area 4-C is set to a multiple of a horizontal direction size of MCU (minimum coded unit (MCU): minimum data unit of JPEG), and the vertical length Va is set equal to the vertical direction size of MCU. Va is therefore "8" for a thinning-out ratio of 4:2:2 of JPEG.

As described above, an output of the signal processing circuit 9 becomes valid only in a partial area of each block. As shown in FIG. 4, the process SSG circuit 7 controls the two-dimensional DMAC 16 in such a manner that the area 4-A overlaps the area 4-C of the upper block and the area 4-B overlaps the area 4-C of the left block.

Figure 6:
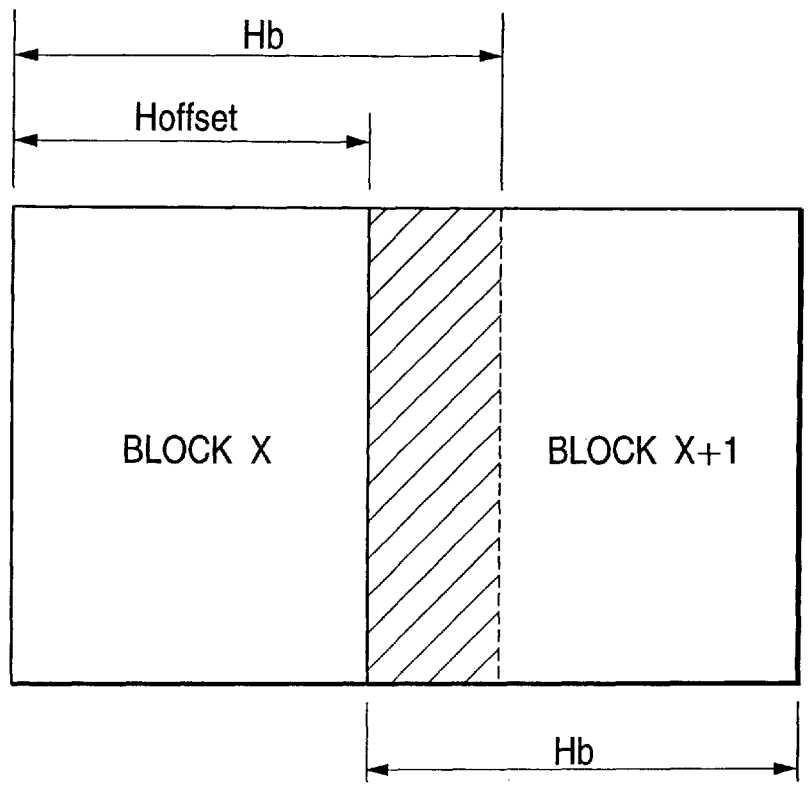
FIG. 6 is a diagram illustrating an overlap of blocks in the horizontal direction.
Figure 7:
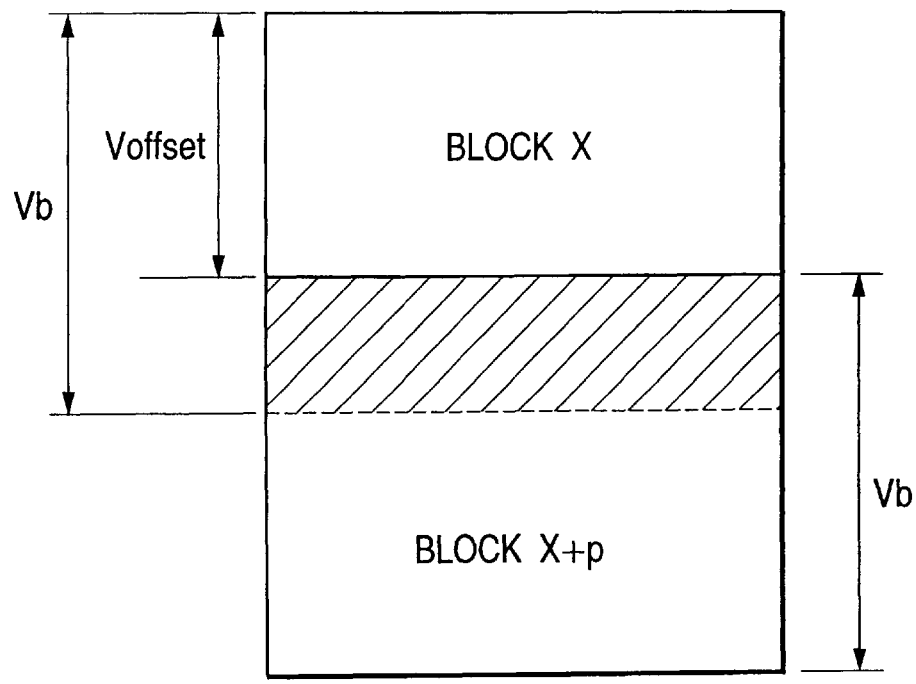
FIG. 7 is a diagram illustrating an overlap of blocks in the vertical direction.

The overlap in the horizontal direction is shown in FIG. 6, and that in the vertical direction is shown in FIG. 7.

Referring to FIG. 6, blocks X and X+1 are overlapped in the horizontal direction. In this case, Hoffset=Ha.

Referring to FIG. 7, blocks X and X+p are overlapped in the vertical direction. In this case, Voffset=Va.

Figure 8:
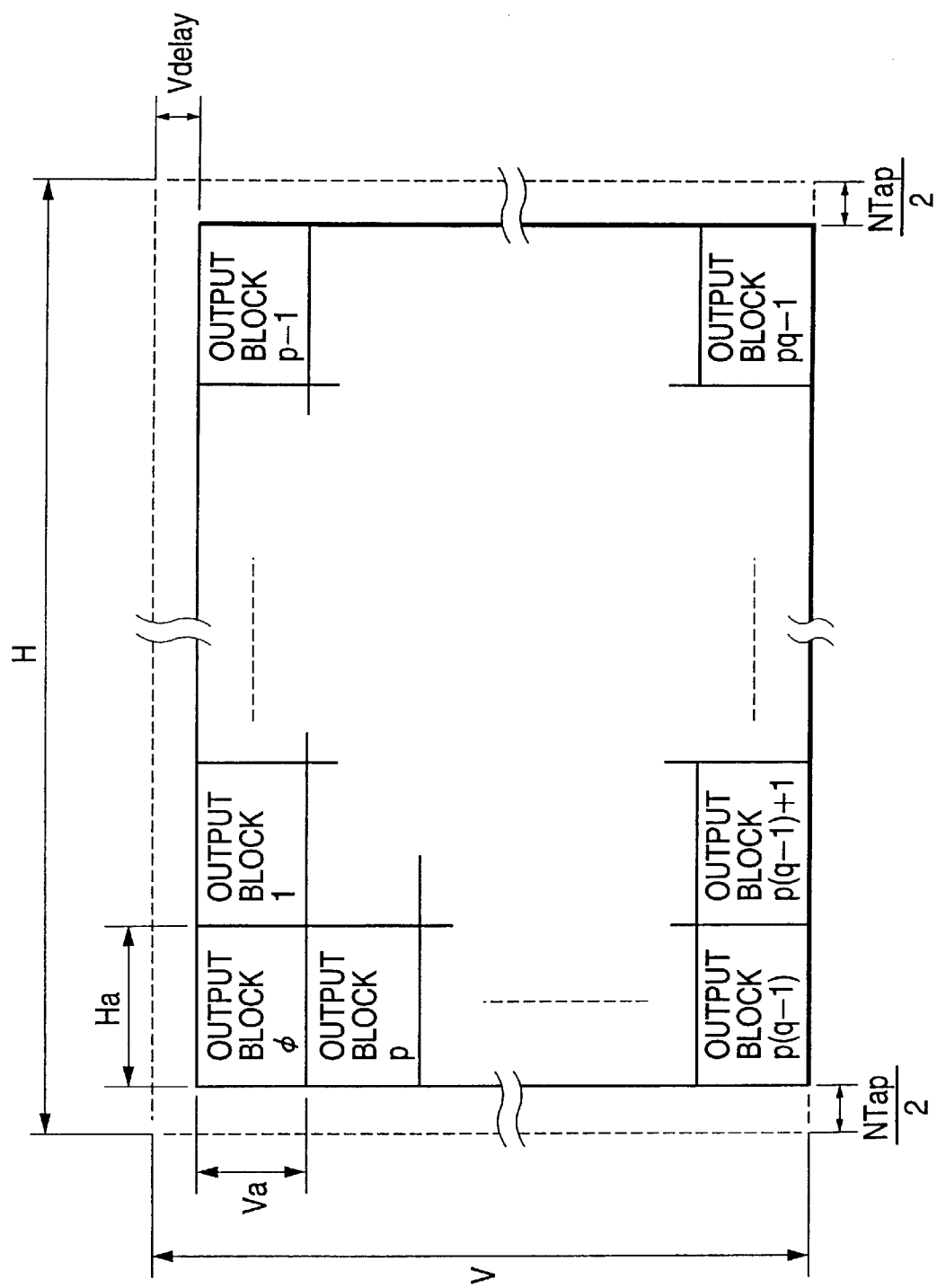
FIG. 8 is a diagram illustrating output data of the signal processing circuit.

As shown in FIG. 8, the signal processing circuit 9 processes image data of one frame and supplies a raster/block converter 10 with output blocks 0, 1, . . . pq-1 in this order. However, image data output from the signal processing circuit 9 is smaller than the whole input image data by Hfil at right and left end portions in the horizontal direction and by Vdelay lines at the upper end portion in the vertical direction.

The sixe of each output block is Ha in the horizontal direction and Va in the vertical direction. The raster/block converter 10 sequentially and continuously converts these output blocks and outputs signals equivalent to those when image data not divided into blocks is supplied. A storage capacity of a line buffer in the raster/block converter 10 is therefore sufficient if such the capacity has Ha lines in the horizontal direction and Va lines in the vertical direction.

Next, a JPEG compression circuit 11 compresses by JPEG method, image date raster/block converted by the raster/block converter 10, and writes the compressed image data in RAM 4 via the CPU bus 3. Upon reception of an instruction from CPU 5, the JPEG compressed data written in RAM 4 is recorded in a recording medium 13 via the CPU bus 3 and an I/F 12 in accordance with a file record format such as FAT.

In this embodiment, the buffer capacities required for the delay circuit 8 and raster/block converter 10 are calculated in the following manner, assuming that input image data has 1034 pixels in the horizontal direction and 770 pixels in the vertical direction, the horizontal filter of the signal processing circuit 9 has 11 taps, the vertical filter has three taps, the thinning-out ratio of JPEG is 4:2:2, CCD image data has ten bits per pixel, YUV each has eight bits per pixel, and an image is divided into four 6 blocks in the horizontal direction and 96 blocks in the vertical direction:

Ha=(1034−Hfil×2)/4 (division)
=(1034−5×2)/4
=256
Va=8
Vb=Va+2
=10 bits
Hb=Ha+Hfil×2
=256+5×2
=266 therefore, the buffer capacity of the delay circuit 8 is 2×Hb×10 bit=5320 bits; and the buffer capacity of the raster/block converter is Va×Ha×((number of bits of Y)+(number of bits of UV))=
8×Ha×((number of bits of Y)+(number of bits of UV))=
8×256×16 bits =32768 bits.

The embodiment can therefore reduce the buffer capacity more than that used by the conventional process described earlier.

Figure 9:
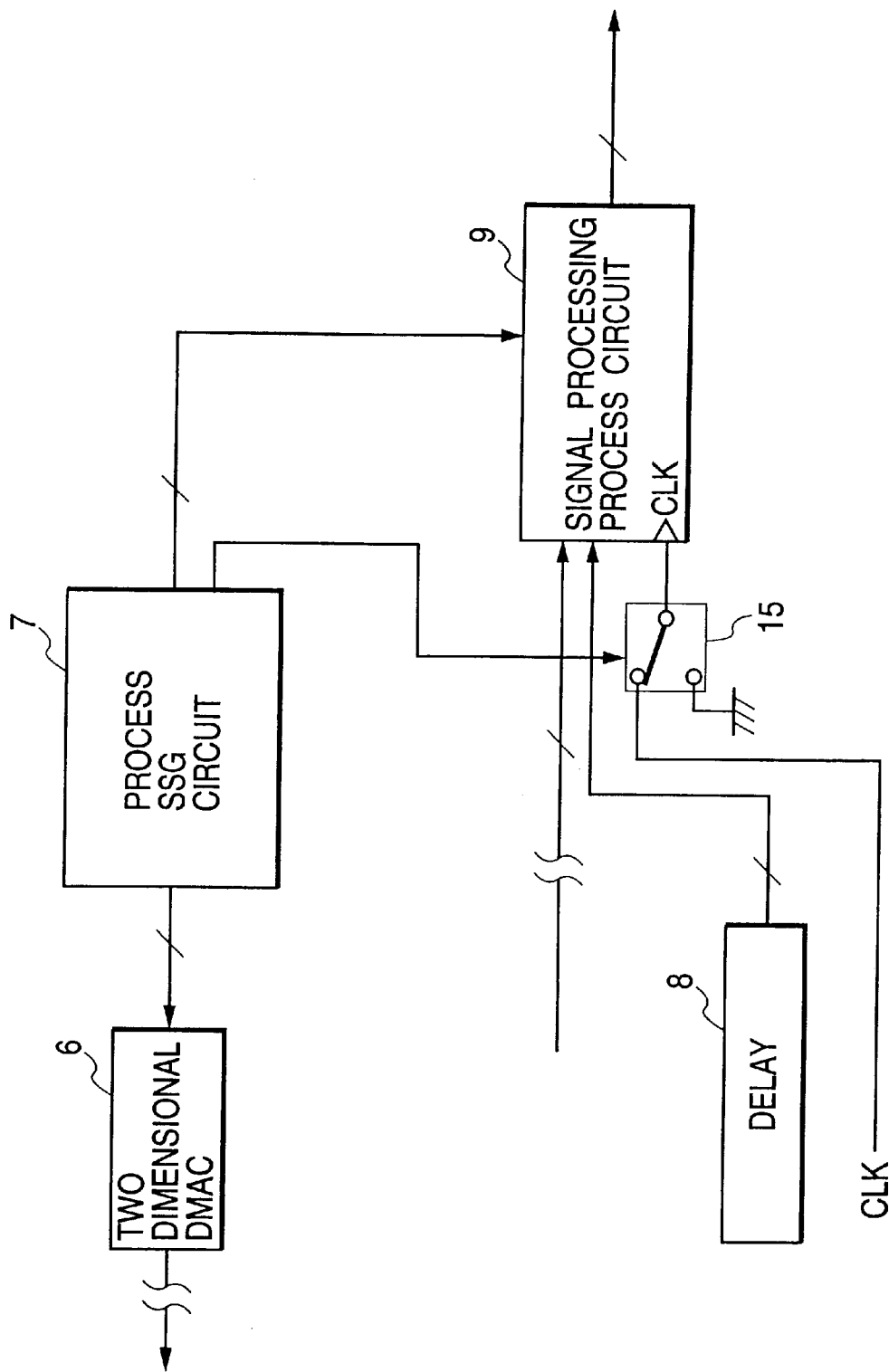
FIG. 9 is a block diagram illustrating a clock control of the signal processing circuit, the clock control being executed by a process SSG circuit.

While image data is read from the area 4-A of RAM 4 shown in FIG. 5, the output of the signal processing circuit 9 is always invalid and the signal output from the delay circuit 8 to the signal processing circuit 9 is also invalid. Therefore, as shown in FIG. 9, the process SSG circuit 7 may control clock signals which drive the signal processing circuit 9, and during the period while image data in the area 4-A is read from RAM 4, a supply of clock signals to the signal processing circuit 9 is stopped by a switch 15. Even if such a clock control is performed for the signal processing circuit 9, valid output signals are not affected at all because the clock control is performed during the period while invalid signals are output.

In this embodiment, although parameters and two-dimensional DMAC 6 are used, the process SSG circuit 7 may control a usual DMAC to read image data from RAM 4 in the manner similar to the embodiment.

Figure 10:
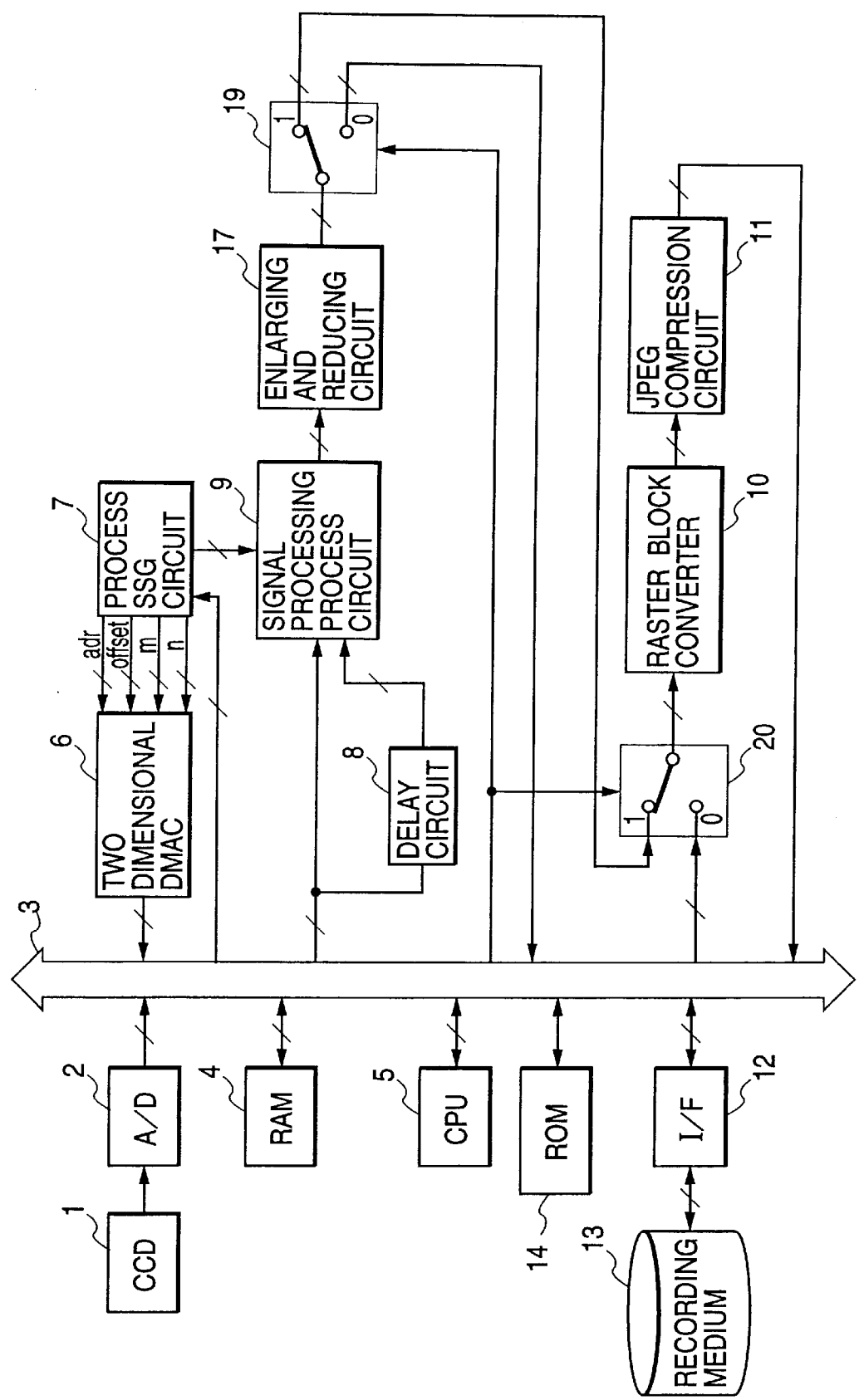
FIG. 10 is a block diagram showing the structure on an image processing apparatus according to a second embodiment of the invention.

FIG. 10 is a block diagram showing an image processing apparatus according to the second embodiment of the invention. In this embodiment, switches 19 and 20 and an enlarging and reducing circuit 17 are added to the first embodiment apparatus. In FIG. 10, same elements as those shown in FIG. 1 are represented by using identical reference numerals. Accumulated charge information of CCD 1 is A/D converted and stored in RAM 4 as shown in FIG. 2.

A process SSG circuit 7 sets four values including a DMA transfer start address adr, a horizontal transfer number m, a vertical transfer number n, and a vertical offset value offset, to a two-dimensional DMAC 6 to thereby read image data from RAM 4.

FIG. 3 illustrates the read sequence of image data from RAM 4 assuming that adr=0×030 (hereinafter, numerals added with 0x are hexadecimal numerals), m=0×8, n=0×5, and offset=0×010.

The two-dimensional DMAC 6 holds adr therein as a read start address, and resets an internal counter for holding the horizontal read number and another internal counter for holding the vertical read number, to "0". Each time data is read, the counter for holding the horizontal read number is incremented by "1" and the read address is also incremented by "1".

When the count of the counter for holding the horizontal read number coincides with m, the data read start address is incremented by offset, the counter for holding the horizontal read number is reset to "0", the counter for holding the vertical read number is incremented by "1", and the read start address is set as the read address. Data read is terminated after the counter for holding the vertical read number coincides with n. In this manner, by sequentially changing the read address, data is read from a rectangular area of RAM 4 as shown in FIG. 3.

The process SSG circuit 7 repetitively controls the two-dimensinal DMAC 6 to divide image data in RAM into a plurality of blocks and read blocks 0, 1, 2, . . . pg-1 in this order from RAM 4 as shown in FIG. 4. In this manner, the image data read from RAM 4 is supplied via the CPU bus 3 to a delay circuit 8 and a signal processing circuit 9.

Each of blocks 0 to pq-1 is constituted of four areas as shown in FIG. 5, and each block is featured as described earlier.

Next, the enlarging and reducing circuit 17 enlarges or reduces an output of the signal processing circuit 9 at an enlargement or reduction factor designated by CPU 5. The structure of this enlarging and reducing circuit 17 is disclosed, for example, in Japanese Patent Application No. 5-227414. A method of calculating data to be output from the enlarging and reducing circuit 17 changes according to the sequential order of input image data.

Figure 11:
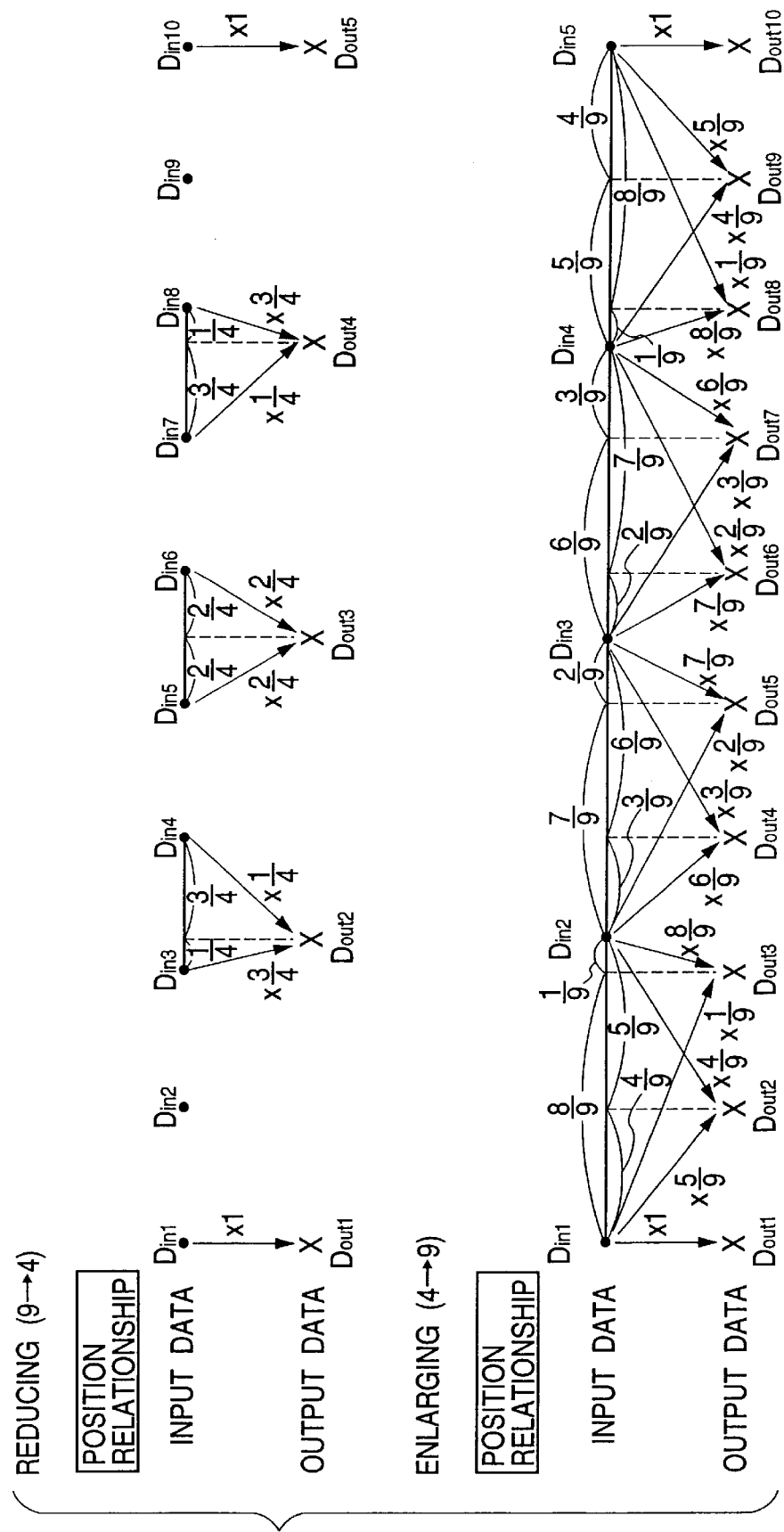
FIG. 11 is a diagram illustrating a phase relation of input and output data during enlargement and reduction.

For example, FIG. 11 shows a phase relation between input and output data when image data is reduced by 4/9 and when image data is enlarged by 9/4.

In the case of reduction by 4/9, the phase of input data changes in nine periods and the phase of output data changes in four periods as:

Dout1=Din1
Dout2=3/4Din3+1/4Din4
Dout3=2/4Din5+2/4Din6
Dout4=1/4Din7+3/4Din8
Dout5=Din10

Similarly, in the case of enlargement by 9/4, the phase of input data changes in four periods and the phase of output data changes in nine periods as:

Dout1=Din1
Dout2=5/9Din1+4/9Din2
Dout3=1/9Din1+8/9Din2
Dout4=6/9Din2+3/9Din3
Dout5=2/9Din2+7/9Din3
Dout6=7/9Din3+2/9Din4
Dout7=3/9Din3+6/9Din4
Dout8=8/9Din4+1/9Din5
Dout9=4/9Din4+5/9Din5
Dout10=Din5

At an M/N enlargement factor, (N+1) pieces of input data are required in order to output M pieces of data from the enlargement and reducing circuit 17. Therefore, Ha and Va defining the size of the area 4-C are determined in the following manner.

Enlargement only in Horizontal Direction

If the enlarging and reducing circuit 17 enlarges an image by M/N in the horizontal direction to resize or square the image, Ha and Va are determined so that the image data of Ha×Va processed by and output from the enlarging and reducing circuit 17 has a horizontal size which is a multiple of the MCU horizontal direction size and a vertical size equal to the MCU vertical direction size. Therefore, Ha takes a value provided by multiplying a least common multiple of M and the MCU horizontal direction size by N/M and adding "1" to the multiplication result and Va takes the MCU vertical direction size.

When only the horizontal direction is enlarged, both the switches 19 and 20 are turned to the contact "1" side, so that the output of the enlarging and reducing circuit 17 is supplied via the switches 19 and 20 to a raster/block converter 10.

For example, assuming that effective image data after signal processing for CCD 1 has 960 (horizontal) ×768 (vertical) pixels, the image is enlarged by 16/15 in the horizontal direction to form image data having 1024 (horizontal)×768 (vertical) pixels, and this image data is JPEG compressed through thinning-out of 4:2:2, Ha and Va are determined in the following manner:

MCU horizontal direction size=16 pixels, and MCU vertical direction size=8 pixels;

therefore

Ha=(least common multiple of 16 and 16)/16×15×n+1= 15×n+1 (n is a natural number), and Va=8.

The maximum value of n is determined from the buffer capacities of the delay circuit 8 and raster/block converter 10. For example, assuming that accumulated charge information of one pixel of CCD is constituted of 10 bits, the delay circuit 8 has a buffer capacity capable of storing two lines of horizontal 640 pixels the raster/block converter 10 has a buffer capacity capable of storing eight lines of horizontal 640 pixels, and Hfil is "5", then:

n1=(640−1−Hfil×2)/15=41 (numerals lower than decimal point are rounded off);

n2=640(15×16/15)=40 (numerals lower than decimal point are rounded off); and (maximum value of n)=(smaller one of n1 and n2)=40.

Each time the signal processing circuit 9 processes one block, the enlarging and reducing circuit 17 outputs to the raster/block converter 10 image data having (16×n) (horizontal)×8 (vertical) pixels, i.e., image data having a horizontal size which is a multiple of the MCU horizontal direction size and a vertical size which is equal to the MCU vertical direction size.

Reduction only in Horizontal Direction

If the enlarging and reducing circuit 17 reduces an image by M/N in the horizontal direction to resize or square the image, Ha and Va are determined so that the image data of Ha×Va processed by and output from the enlarging and reducing circuit 17 has a horizontal size which is a multiple of the MCU horizontal direction size and a vertical size equal to the MCU vertical direction size. Therefore, Ha takes a value provided by multiplying N/M by a least common multiple of M and the MCU horizontal direction size, and Va takes the MCU vertical direction size.

When only the horizontal direction is reduced, both the switches 19 and 20 are turned to the contact "1" side, so that the output of the enlarging and reducing circuit 17 is supplied via the switches 19 and 20 to a raster/block converter 10.

For example, assuming that effective image data after signal processing for CCD 1 has 1060 (horizontal) ×768 (vertical) pixels, the image is reduced by 28/29 in the horizontal direction to form image data having 1024 (horizontal)×768 (vertical) pixels, and this image data is JPEG compressed through thinning-out of 4:2:2, Ha and Va are determined in the following manner:

MCU horizontal direction size=16 pixels, and MCU vertical direction size=8 pixels;

therefore

Ha=(least common multiple of 28 and 16)/28×29×n= 116×n (n is a natural number), and Va=8.

The maximum value of n is determined from the buffer capacities of the delay circuit 8 and raster/block converter 10. For example, assuming that accumulated charge information of one pixel of CCD is constituted of 10 bits, the delay circuit 8 has a buffer capacity capable of storing two lines of horizontal 640 pixels, the raster/block converter 10 has a buffer capacity capable of storing eight lines of horizontal 640 pixels, and Hfil is "5", then:

n1=(640−2×Hfil)/116=5 (numerals lower than decimal point are rounded off);

n2=640/(116×28/29)=5 (numerals lower than decimal point are rounded off); and (maximum value of n)=(smaller one of n1 and n2)=5.

Each time the signal processing circuit 9 processes one block, the enlarging and reducing circuit 17 outputs to the raster/block converter 10 image data having (7×16×n) (horizontal)×8 (vertical) pixels, i.e., image data having a horizontal size which is a multiple of the MCU horizontal direction size and a vertical size equal to the MCU vertical direction size.

Enlargement in Vertical Direction by Devisor of MCU Vertical Direction Size

If the enlarging and reducing circuit 17 enlarges an image by a divisor of the MCU vertical direction size in the vertical direction, Ha is determined in the manner similar to that in "Enlargement only in Horizontal Direction" or "Reduction only in Vertical Direction".

The block vertical size Va is determined as in the following:

if the MCU vertical direction size is "8", then

Va=8 at an enlargement factor "1"

Va=4 at an enlargement factor "2"

Va=2 at an enlargement factor "4"

Va=1 at an enlargement factor "8"; whereas if the MCU vertical direction size is "16", then Va=16 at an enlargement factor "1"

Va=8 at an enlargement factor "2"

Va=4 at an enlargement factor "4"

Va=2 at an enlargement factor "8"

Va=1 at an enlargement factor "16".

In this case, both the switches 19 and 20 are turned to the contact "1" side, so that the output of the enlarging and reducing circuit 17 is supplied via the switches 19 and 20 to raster/block converter 10. Each time the signal processing circuit 9 processes one block, the enlarging and reducing circuit 17 outputs to the raster/block converter 10 image data having a horizontal size which is a multiple of the MCU horizontal direction size and a vertical size equal to the MCU vertical direction size.

Reduction in Vertical Direction by 1/n

If the enlarging and reducing circuit 17 reduces an image by 1/n, Ha is determined in the manner similar to that in "Enlargement only in Horizontal Direction" or "Reduction only in Vertical Direction".

Va is determined as:

Va=(MCU vertical direction size)×n.

In this case, both the switches 19 and 20 are turned to the contact "1" side, so that the output of the enlarging and reducing circuit 17 is supplied via the switches 19 and 20 to a raster/block converter 10. Each time the signal processing circuit 9 processes one block, the enlarging and reducing circuit 17 outputs to the raster/block converter 10 image data having a horizontal size which is a multiple of the MCU horizontal direction size and a vertical size equal to the MCU vertical direction size.

Enlargement/Reduction in Vertical Direction other than Enlargement by Divisor of MCU Vertical Direction Size and Reduction by 1/n If the enlarging and reducing circuit 17 enlarges in the vertical direction, an image by Mv/Nv other than a divisor of the MCU vertical direction size and 1/n and enlarges or reduces the image by Mh/Nh in the horizontal direction, Ha is determined as:

Ha=(multiple of Nh)+1 for enlargement; and

Ha=(multiple of Nh) for reduction.

Va is determined as a multiple of Va. In this case, CPU 5 operates to make both the switches 19 and 20 be turned to the contact "0" side, so that the output of the signal processing circuit 9 is enlarged or reduced by the enlarging and reducing circuit 17 and thereafter temporarily stored in RAM 4. The image data written in RAM 4 is divided in the unit of MCU vertical direction size and supplied via the switch 20 the raster/block converter 10.

By determining Ha and Va and controlling the switches 19 and 20 in the manner described above, an image data having a horizontal size which is an integer multiple of the MCU horizontal direction size and a vertical size which is equal to the MCU vertical direction size, is output to the raster/block converter 10.

The process SSG circuit 7 controls the two-dimensional DMAC 6 in such a manner that areas of each block overlap as shown in FIG. 6 in the horizontal direction and in FIG. 7 in the vertical direction.

In FIG. 6, Hoffset is:

Hoffset=Ha (for reduction); and

Hoffset=Ha−1 (for enlargement).

For the reduction, the areas 4-C of the blocks X and X+1 become continuous in the horizontal direction, and for the enlargement, the areas 4-C of the blocks X and X+1 overlaps by one pixel in the horizontal direction.

In FIG. 7, Voffest is:

Voffset=Va.

The areas 4-C of the blocks X and X+p become continuous in the vertical direction.

With the above operations, even if the image is divided and processed in the unit of block by the enlarging and reducing circuit 17, distortion of the image to be caused by phase differences is not formed.

In the second embodiment, Ha is determined from an enlargement or reduction factor. This factor may be determined from the buffer capacities of the delay circuit 8 and raster/block converter 10.

For example, assuming that the buffer capacity of the raster/block converter 10 is 320 pixels in the horizontal direction, a target enlargement factor is 11/10, and the MCU horizontal direction size is 16, the horizontal direction size Ha of the area 4-C of a block which makes the buffer memory of the raster/block converter 10 full, is:

Ha=320×10/11=291 (numerals lower than decimal point are rounded off).

In this case, the enlargement factor of the enlarging and reducing circuit 17 is set to 320/291 so that the number of horizontal pixels in an output of the enlarging and reducing circuit 17 is 320 which satisfies the condition of a multiple of the MCU horizontal direction size. Although this factor is different from the target enlargement factor, this precision does not pose any practical problem.

Figure 12:
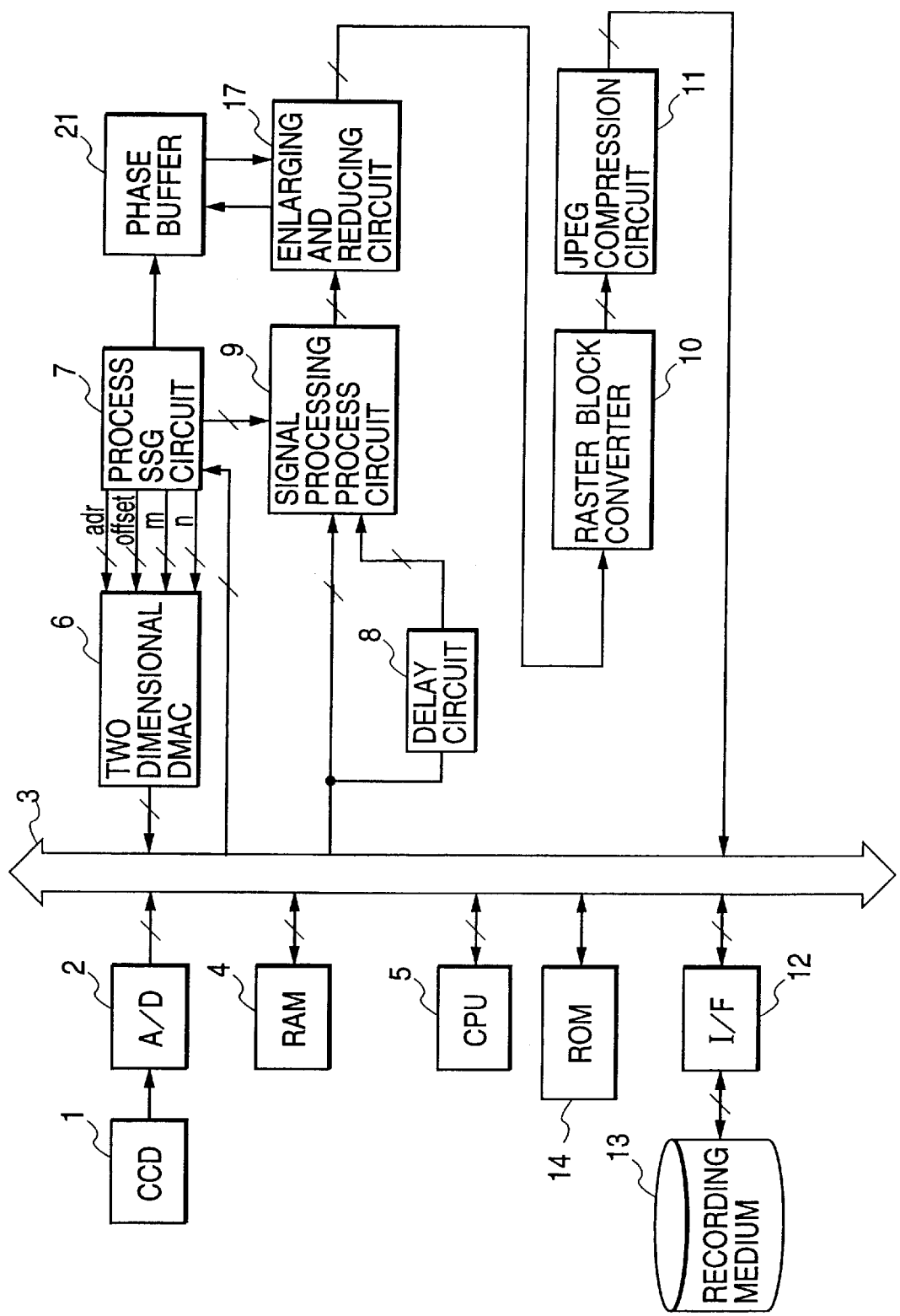
FIG. 12 is a block diagram showing the structure of an image processing apparatus according to a third embodiment of the invention.

FIG. 12 is a block diagram showing an image processing apparatus according to the third embodiment of the present invention. In this embodiment, a phase buffer 21 is provided which is connected to a process SSG circuit 7 and an enlarging and reducing circuit 17. In FIG. 12, the same elements as those shown in FIG. 10 are shown by using identical reference numerals.

Image information of CCD 1 stored in RAM 4 as shown in FIG. 2 is read by the process SSG circuit 7 and two-dimensional DMAC 6 in the order illustrated in FIG. 3. In this case, in the two-dimensional DMAC 6, the operations of an internal counter for holding the horizontal read number and another internal counter for holding the vertical read number, are performed in the manner similar to the second embodiment illustrated in FIG. 10. By changing the read address of RAM 4, image data is read from a rectangular area of RAM 4 as shown in FIG. 3.

As shown in FIG. 4, image data divided into a plurality of blocks is read from RAM 4 in the order of blocks 0, 1, 2, . . . , pg-1. The image data read from RAM 4 is supplied via a CPU bus 3 to a delay circuit 8 and a signal processing circuit 9. Each of blocks 0 to pq-1 is constituted of four areas as shown in FIG. 5.

Similar to the embodiment shown in FIG. 10, the enlarging and reducing circuit 17 calculates output data by a different method depending upon the sequential order of input image data.

For example, the phase relations between input and output data at a reduction factor of 1/9 and at an enlargement factor of 9/4 are set in the manner as illustrated in FIG. 11.

As described earlier, in order for the enlarging and reducing circuit 17 to output M pieces of data at an enlargement factor of M/N, N+1 pieces of input data are necessary. Therefore, depending upon the width of Ha, the phase in the enlarging and reducing circuit 17 may become discontinuous when the block changes, and image distortion is generated.

In order to avoid this, in this embodiment, the phase in the enlarging and reducing circuit 17 at the boundary of adjacent blocks and image data are stored in the phase buffer. When the block changes, the phase at the boundary of geometrically adjacent blocks and image data are read to perform an interpolation operation for enlargement and reduction.

The operation of storing and reading the phase and image data at the block boundary will be described.

Figure 13:
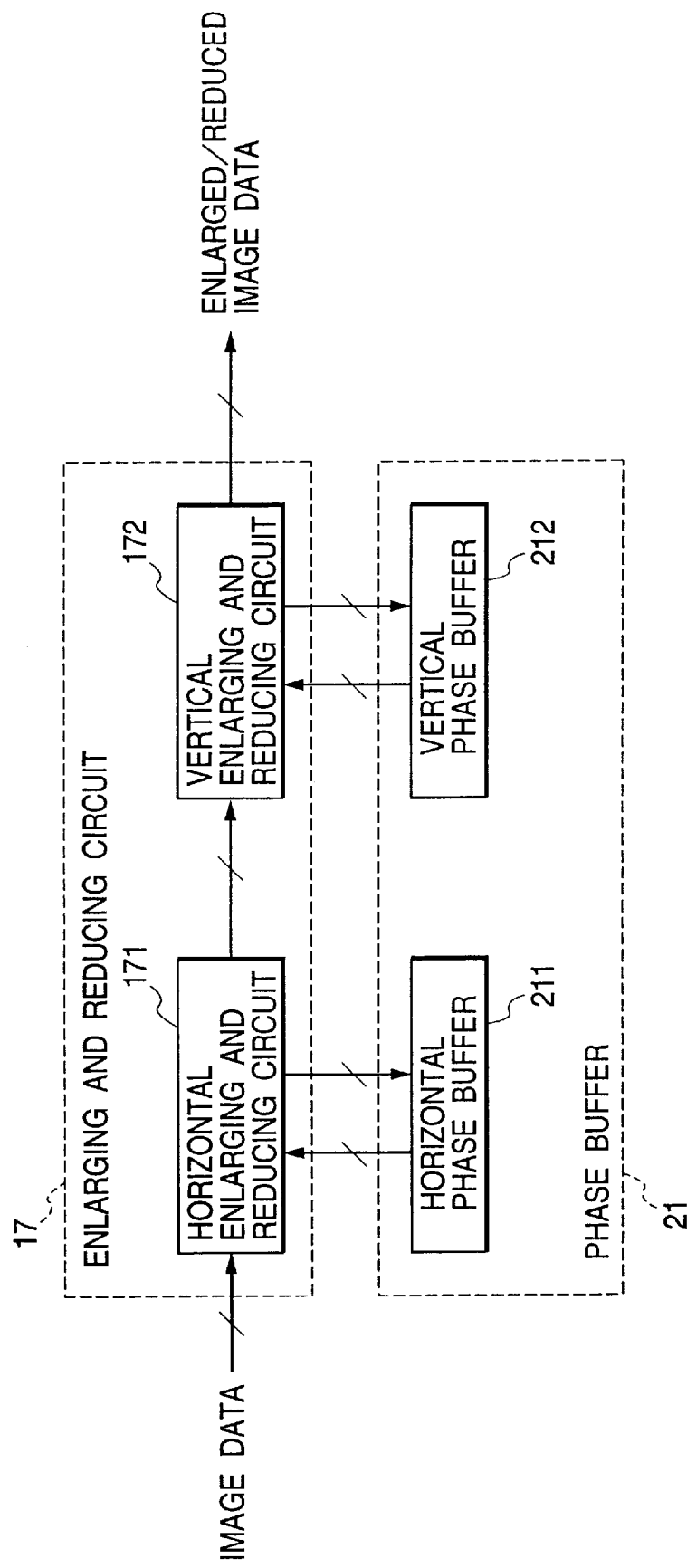
FIG. 13 is a block diagram showing the structures of an enlarging and reducing circuit and phase buffers according to the third embodiment.

FIG. 13 shows the structures of the enlarging and reducing circuit 17 and phase buffer 21. The enlarging and reducing circuit 17 is constituted of a horizontal enlarging and reducing circuit 171 and a vertical enlarging and reducing circuit 172, and the phase buffer 21 is constituted of a horizontal phase buffer 211 and a vertical phase buffer 212.

Figure 14:
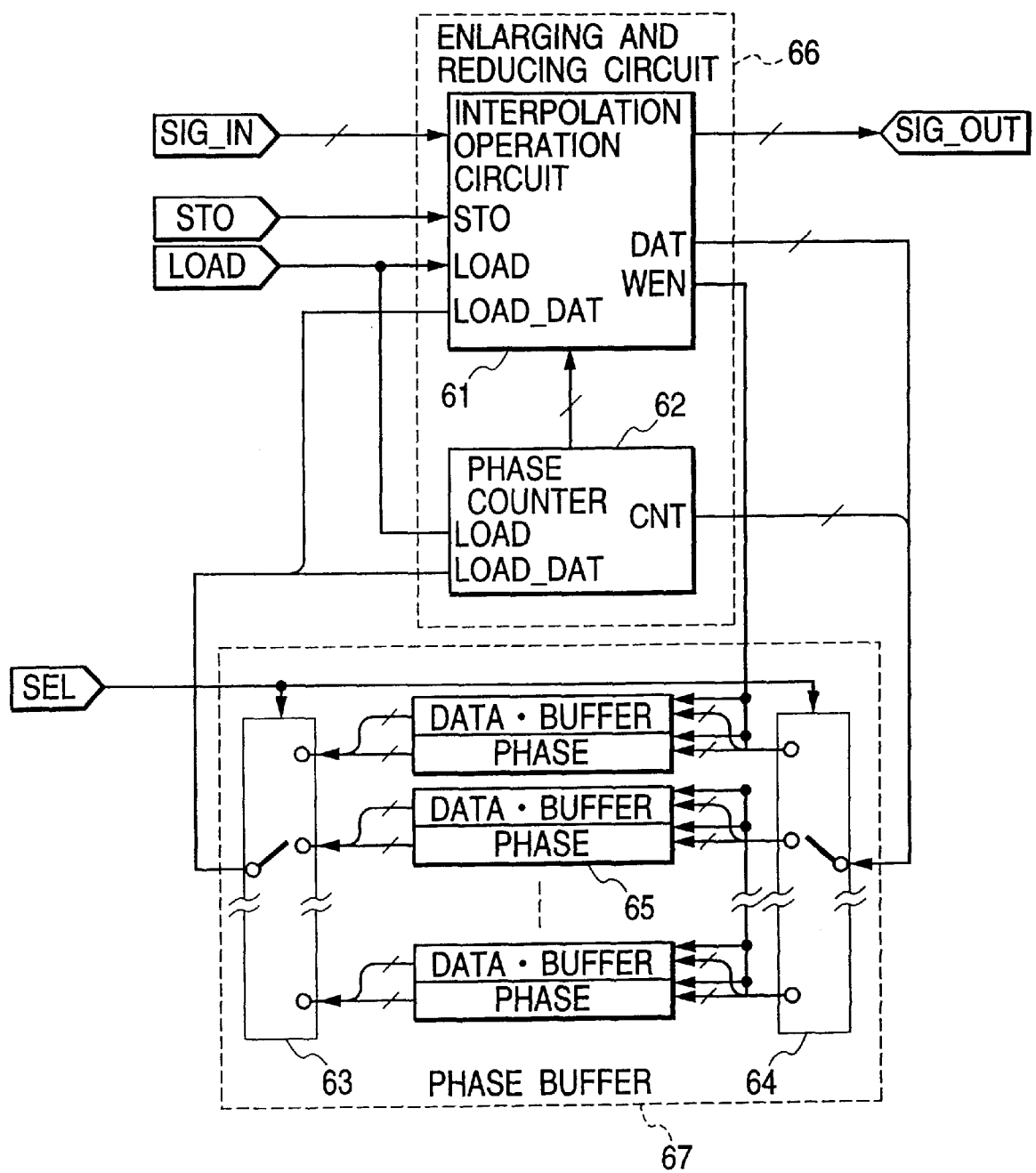
FIG. 14 is a block diagram showing the fundamental structures of the enlarging and reducing circuit and phase buffers.

FIG. 14 shows the structures of an enlarging and reducing circuit 66 constituting each enlarging and reducing circuit 171, 172 and a phase buffer 67 constituting each phase buffer 211, 212. In FIG. 14, SIG-IN, STO, LOAD, and SEL are control signals supplied from the process SSG circuit 7. The enlarging and reducing circuit 66 reads image data via SIG-IN and an interpolation operation is performed by an interpolation operation circuit 61. A phase for such the interpolation operation is obtained from the phase counter 62.

When STO becomes active (in the following description, the control signal takes an active high level), image data, image data at two points for linear interpolation, stored in the interpolation operation circuit 61 is output via a DAT terminal of the interpolation operation circuit and WEN (write enable) is made active. At this time, image data is written in a buffer memory 65 selected by a switch 64 in accordance with the value of SEL. Also at this time, a count indicating a current phase and output via a CNT terminal of the phase counter 62 is selected by the switch and written in the buffer memory 65.

When LOAD becomes active, the phase and image data stored in the buffer memory 65 selected by a switch 63 in accordance with the value of SEL are output to the phase counter 62 and interpolation operation circuit 61. When LOAD becomes active, the interpolation operation circuit 61 supplied the image data to the interpolation operation circuit 61 via a LOAD-DAT terminal. When LOAD becomes active, the phase counter 62 reads the phase via a LOAD-CNT terminal.

The control to be executed by the process SSG circuit 7 relative to the horizontal enlarging and reducing circuit 171, horizontal phase buffer 211, vertical enlarging and reducing circuit 172, and vertical phase buffer 212 operating in the above manner will be described with reference to FIG. 15.

Figure 15:
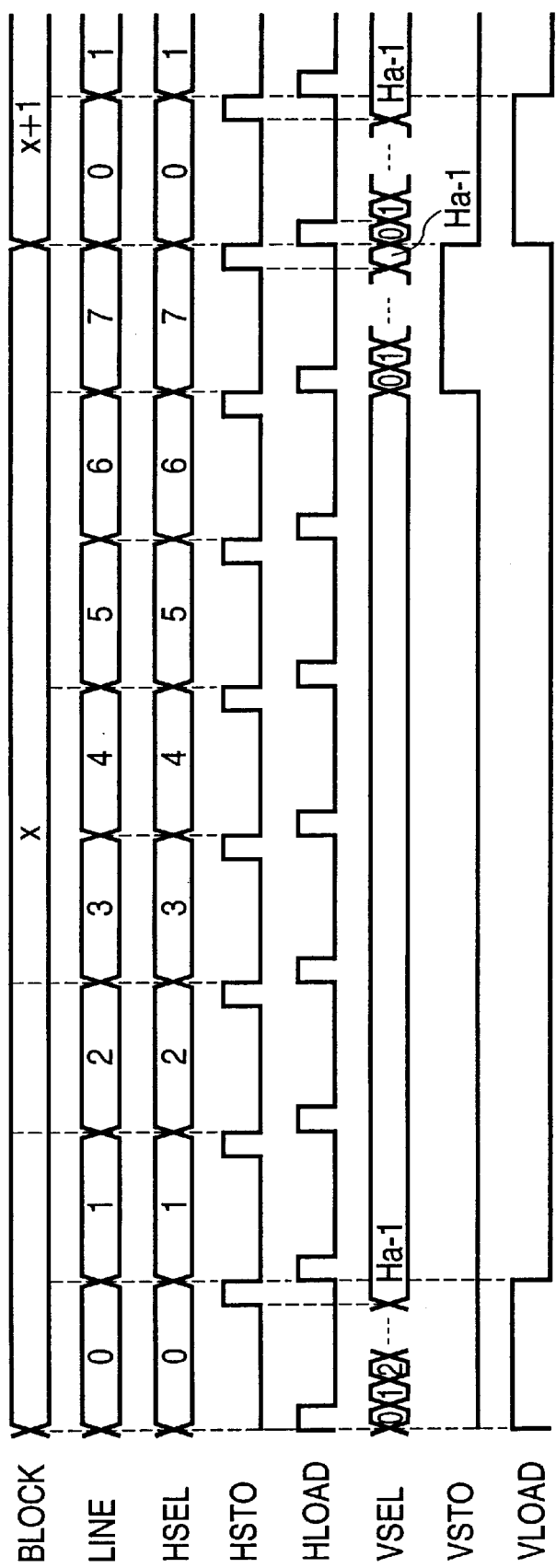
FIG. 15 is a timing chart illustrating the operation of control signals output from a process SSG circuit.

In FIG. 15, HSEL, HSTO, and HLOAD are SEL, STO, and LOAD of the horizontal enlarging and reducing circuit 171 and horizontal phase buffer 211. VSEL, VSTO, and VLOAD are SEL, STO, and LOAD of the vertical enlarging and reducing circuit 172 and vertical phase buffer 212.

HLOAD is made active before the horizontal enlarging and reducing circuit 171 processes image data at the top of a line of each block, and HSEL is set to the value same as the line number in the block of current image data. Therefore, the horizontal enlarging and reducing circuit 171 reads from the horizontal phase buffer 211 the image data and phase at the end of the same line in the preceding block.

HSTO is made active after the horizontal enlarging and reducing circuit 171 processes image data at the end of a line of each block, and HSEL is set to the value same as the line number in the block of current image data. Therefore, the image data and phase at the end of the current line is read out from the horizontal enlarging and reducing circuit 171 and then written into the horizontal phase buffer 211.

VLOAD is made active while the enlarging and reducing circuit 172 processes image data of the first line of each block, and VSEL is set to the value indicating the horizontal pixel position of the image data to be processed in the block. Therefore, the vertical enlarging and reducing circuit 172 reads from the vertical phase buffer 212 the image data at the same horizontal pixel position one line before.

VSTO is made active while the enlarging and reducing circuit 172 processes image data of the last line of each block, and VSEL is set to the value indicating the horizontal pixel position of the image data to be processed in the block. Therefore, the image data and phase at the current line is read out from the vertical enlarging and reducing circuit 172 and then written into the vertical phase buffer 212.

The horizontal phase buffer 211 is reset when the enlargement/reduction is completed for the block p1, 2p-1, . . . , pq-1 shown in FIG. 4, i.e., the last horizontal block. The vertical phase buffer 212 is reset when the enlargement/reduction is completed for the block pq-1 shown in FIG. 4, i.e., the last block of one frame.

As the process SSG circuit 7, enlarging and reducing circuit 17 and phase buffer 21 operate in the manner described above, enlargement/reduction without distortion can be performed through pipelining processings by hardware even if image data is divided.

An output of the enlarging and reducing circuit 17 is input to a raster/block converter 10. The raster/block converter 10 performs a raster/block conversion of the image data having a horizontal size which is a multiple of the MCU horizontal direction size and a vertical size equal to the MCU vertical direction size. Ha and Va of the area 4-C are therefore determined so that the image data enlarged/reduced by the enlarging and reducing circuit 17 has a horizontal size which is a multiple of the MCU horizontal direction size and a vertical size equal to the MCU vertical direction size.

The buffer capacity of the phase buffer 21 necessary for storing the phase and image data is determined as in the following. For example, assuming that the image enlarged/reduced has 1024 horizontal pixels, one pixel is constituted of 16 bits, the phase is expressed by 8 bits, the MCU vertical direction size is 8, and the reduction is performed at a reduction factor of 4/5 in the vertical direction, the buffer capacities are:

(16+8)×8×5/4=240 bits for the horizontal phase buffer 211; and (16+8)×1024=24576 bits for the vertical phase buffer 212.

Figure 16:
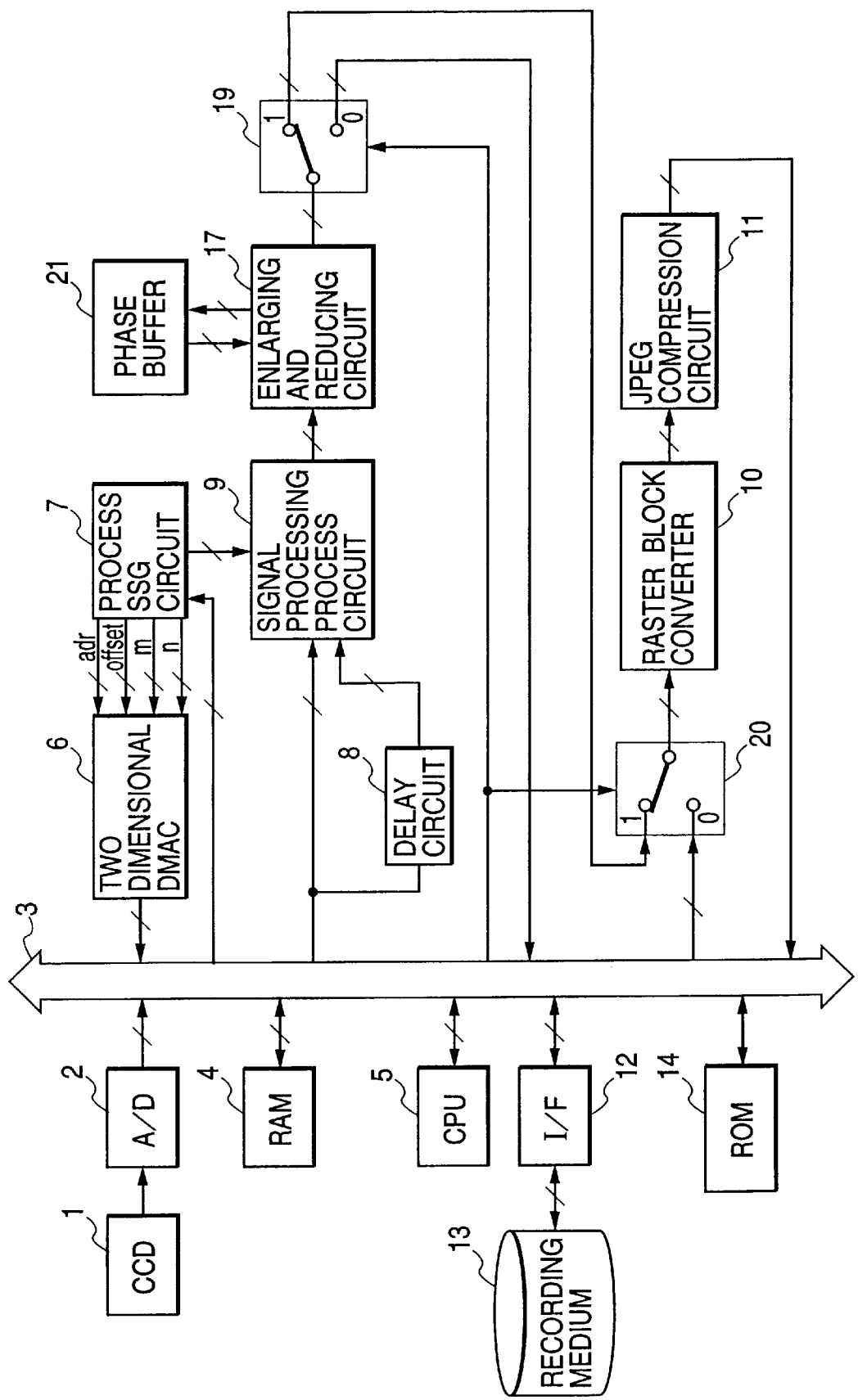
FIG. 16 is a block diagram showing the structure of an image processing apparatus according to a fourth embodiment of the invention.

FIG. 16 is a block diagram showing an image processing apparatus according to the fourth embodiment of the invention. A different point from the third embodiment is a provision of switches 19 and 20.

In this embodiment, as shown in FIG. 17, an enlarging and reducing circuit 17 and a phase buffer 21 are constituted of a horizontal enlarging and reducing circuit 91, a vertical enlarging and reducing circuit 93, and a horizontal phase buffer 92.

If CCD 1 has non-square pixels, the enlarging and reducing circuit 17 squares each pixel by enlarging or reducing only in the horizontal direction. In this case, the block division of image data is performed in the manner similar to the third embodiment, and CPU 5 turns the switches 19 and 20 to the contact "1" side.

The enlarging and reducing circuit 17 can therefore output an image having a horizontal size which is a multiple of the MCU horizontal direction size and a vertical size equal to the MCU vertical direction size. An output of the enlarging and reducing circuit 17 is input via the switches 19 and 20 to a raster/block converter 10 to be raster/block converted, and thereafter JPEG compressed by a JPEG compression circuit 11. The JPEG compressed data is written in RAM 4.

If the image data is not only squared but also resized, CPU 5 turns the switches 19 and 20 to the contact "0" side. Of Ha and Va of the area 4-C of each block, Ha is set to an arbitrary value which does not exceed the allowable range determined by the buffer capacity of the delay circuit 8, and Va is set as Va=Nv×n (n is a natural number) at an enlargement factor of Mv/Nv at the enlarging and reducing circuit 17.

As described with the third embodiment, of the enlarging and reducing circuit 17, the horizontal enlarging and reducing circuit 91 realizes a continuity of the phase thereof by reading the preceding image data and phase from the phase buffer 21, whereas the vertical enlarging and reducing circuit 93 realizes a continuity of the phase thereof by setting Va to a common multiple of Nv.

An output of the enlarging and reducing circuit 17 is written via the switch 19 and CPU bus 3 into RAM 4. The image data enlarged/reduced and stored in RAM 4 is supplied via the CPU bus 3 and switch 20 to the raster/block converter 10 to be raster/block converted, and thereafter JPEG compressed by the JPEG compression circuit 11. The JPEG compressed data is written in RAM 4.

As described above, according to the embodiments, image data is processed after it is divided into blocks. Therefore, the buffer capacity necessary for the succeeding processes such as processes by a delay circuit and a raster/block converter can be reduced.

Further, the horizontal pixel size allowing image signal processing does not depend upon the capacities of buffer memories to be used by the delay circuit and raster/block converter. Therefore, it is possible to process image data having an arbitrary horizontal pixel size. It is therefore possible to reduce the memory capacity and cost.

Image data having an arbitrary size can be processed and compressed without using a memory such as RAM so that high speed signal processing is possible.

According to the embodiments, image data read from RAM or the like and compressed through JPEG or the like can be processed through hardware pipelining, so that high speed signal processing is possible.

Since the number of accesses to RAM can be reduced, a power required for signal processing can be saved.

Image data having an arbitrary size can be enlarged or reduced independently from the capacities of the buffer memories. It is therefore possible to reduce the memory capacity and cost.

Image squaring including signal processing and compressing can be performed through hardware pipelining without using a memory such as RAM.

Still further, clocks used for signal processing can be stopped during a specific period so that a power required for signal processing can be saved.

In the above embodiments, a JPEG scheme is used as a compression coding method. The invention is not limited only thereto, but is applicable to all coding systems for executing coding on a predetermined block unit basis (e.g., a MPEG scheme).

In other words, the foregoing description of embodiments has been given for illustrative purposes only and not to be construed as imposing any limitation in every respect.

The scope of the invention is, therefore, to be determined solely by the following claims and not limited by the text of the specifications and alterations made with a scope equivalent to the scope of the claims fall within the true spirit and scope of the invention.

What is claimed is:

1. An image processing apparatus comprising:
    input means for inputting image data;
    dividing means for dividing the input image data into blocks, said dividing means dividing the input image data so that adjacent blocks partially overlap the input image data; and
    processing means for filtering the image data divided by said dividing means in a block unit basis,
    wherein a size of the overlap portion of the block is determined in accordance with the number of taps of a filter structure of said processing means.

2. An image processing apparatus according to claim 1, further comprising coding means for compression coding an output of said processing means.

3. An image processing apparatus according to claim 2, wherein a horizontal size of each block is determined from a horizontal size of one frame of the image data and the number of taps of a horizontal filter to be used by said processing means, and a horizontal direction length of an overlapped portion of each block is determined from the number of taps of the horizontal filter.

4. An image processing apparatus according to claim 3, wherein the horizontal size of each block is determined from a horizontal size of a minimum processing unit of said coding means.

5. An image processing apparatus according to claim 3, wherein a vertical size of each block is determined from the number of taps of a vertical filter to be used by said processing means and an operation mode of said coding means, and a vertical direction length of an overlapped portion of each block is determined from the number of taps of the vertical filter.

6. An image processing apparatus according to claim 2, wherein said coding means performs a coding process in conformity with a JPEG scheme.

7. An image processing apparatus according to claim 1, further comprising:
    delay means for delaying the image data to be supplied to said processing means; and
    control means for stopping an operation clock to be supplied to said processing means, during a period while an overlapped portion in a vertical direction is written in said delay means, sequentially from a first block.

8. An image processing apparatus according to claim 1, wherein said dividing means includes memory means for storing the image data, and the image data is divided into blocks by reading the image data from the memory means through two-dimensional DMA.

9. An image processing apparatus according to claim 1, wherein said input means including image pickup means for picking up an object image and outputting the image data.

10. An image processing apparatus according to claim 1, further comprising:
    converting means for enlarging or reducing an output of said processing means; and
    coding means for compression coding an output of said converting means.

11. An image processing apparatus according to claim 10, wherein said coding means performs a coding process in conformity with a JPEG scheme.

12. An image processing apparatus according to claim 10, wherein a horizontal size of each block is determined from a horizontal size of one frame of the image data, the number of taps of a horizontal filter to be used by said processing means and an enlargement factor, in a horizontal direction of said converting means, and a horizontal direction length of an overlapped portion of each block is determined from the number of taps of the horizontal filter and the enlargement factor in the horizontal direction of said converting means.

13. An image processing apparatus according to claim 12, wherein a vertical size of each block is determined from the number of taps of a vertical filter to be used by said processing means and an operation mode of said coding means, and a vertical direction length of an overlapped portion of each block is determined from the number of taps of the vertical filter.

14. An image processing apparatus according to claim 13, wherein said dividing means includes memory means for storing the image data, and the image data is read from the memory means in the block unit basis.

15. An image processing apparatus according to claim 14, wherein an output of said converting means is temporarily stored in the memory means and then supplied to said coding means, in a case other than enlargement at an enlargement factor equal to a divisor of a vertical size of a minimum processing unit in a vertical direction of said coding means or reduction at a reduction factor of one divided by a positive integer.

16. An image processing method comprising the steps of:
    inputting image data;
    dividing the input image data into blocks, said dividing step dividing the input image data so that adjacent blocks partially overlap the input image data; and filtering the divided image data in a block unit basis, wherein a size of the overlap portion of the block is determined in accordance with the number of taps of a filter structure used in performing filtering step.

17. A computer readable storage medium storing an image processing program, the program comprising:

an input process of inputting image data;

a dividing process of dividing the input image data into blocks, said dividing process dividing the input image data so that adjacent blocks partially overlap the input image data; and a process of filtering the divided image data in a block unit basis, wherein a size of the overlap portion of the block is determined in accordance with the number of taps of a filter structure used in performing said filtering process.

* * * * *